(12) United States Patent
Oota et al.

(10) Patent No.: US 10,662,934 B2
(45) Date of Patent: May 26, 2020

(54) ELECTRIC COMPRESSOR, AND REFRIGERATION AIR-CONDITIONING APPARATUS

(71) Applicant: Hitachi-Johnson Controls Air Conditioning, Inc., Tokyo (JP)

(72) Inventors: Ryou Oota, Tokyo (JP); Hiroyuki Akata, Tokyo (JP); Yasutaka Yoshida, Tokyo (JP); Koji Naito, Tokyo (JP); Hideyuki Ueda, Tokyo (JP)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 0 days.

(21) Appl. No.: 16/223,323

(22) Filed: Dec. 18, 2018

(65) Prior Publication Data

US 2019/0128249 A1    May 2, 2019

Related U.S. Application Data

(63) Continuation of application No. PCT/JP2017/037643, filed on Oct. 18, 2017.

(30) Foreign Application Priority Data

Nov. 4, 2016  (JP) .................................. 2016-215951

(51) Int. Cl.
*F04B 39/02* (2006.01)
*C09K 5/04* (2006.01)
(Continued)

(52) U.S. Cl.
CPC .......... *F04B 39/0215* (2013.01); *C09K 5/041* (2013.01); *C09K 5/045* (2013.01);
(Continued)

(58) Field of Classification Search
CPC ...... F04B 39/0215; F04B 35/04; F04B 39/02; F04B 39/00; C10M 171/008;
(Continued)

(56) References Cited

U.S. PATENT DOCUMENTS 6,454,960 B1 * 9/2002 Sunaga .................. C09K 5/045
252/67
2002/0134092 A1    9/2002 Matsuura
(Continued)

FOREIGN PATENT DOCUMENTS

CN  104854780 A  8/2015
JP  2008-208262 A  9/2008
(Continued)

OTHER PUBLICATIONS

Japanese Office Action received in corresponding Japanese Application No. 2016-215951 dated May 7, 2019.
(Continued)

*Primary Examiner* — Emmanuel E Duke
(74) *Attorney, Agent, or Firm* — Mattingly & Malur, PC

(57) ABSTRACT

An electric compressor is provided which has: in a sealed container, a compression mechanism to compress a refrigerant and an electric motor to drive the compression mechanism, wherein the refrigerant contains 20% by mass or more of hydrofluoroolefin, and a refrigerator oil stored in the sealed container contains; polyvinyl ether as a base oil; an alicyclic epoxy compound in an amount of 0.1% by mass or more and 2.0% by mass or less relative to the base oil; an aliphatic epoxy compound in an amount of 0.1% by mass or more and 2.0% by mass or less relative to the base oil; and tertiary phosphate in an amount of 0.1% by mass or more and 2.0% by mass or less relative to the base oil.

15 Claims, 2 Drawing Sheets

(51) Int. Cl.
| | |
|---|---|
| *F04C 29/04* | (2006.01) |
| *F04C 29/02* | (2006.01) |
| *C10M 107/24* | (2006.01) |
| *C10M 129/18* | (2006.01) |
| *C10M 137/04* | (2006.01) |
| *F25B 1/04* | (2006.01) |
| *C10M 171/00* | (2006.01) |
| *F04C 18/02* | (2006.01) |
| *F04B 39/00* | (2006.01) |
| *F04B 35/04* | (2006.01) |
| *C10M 129/72* | (2006.01) |

(52) U.S. Cl.
CPC ........ *C10M 107/24* (2013.01); *C10M 129/18* (2013.01); *C10M 137/04* (2013.01); *C10M 171/008* (2013.01); *F04B 35/04* (2013.01); *F04B 39/00* (2013.01); *F04B 39/02* (2013.01); *F04C 18/0215* (2013.01); *F04C 29/023* (2013.01); *F04C 29/025* (2013.01); *F04C 29/04* (2013.01); *F25B 1/04* (2013.01); *C09K 2205/126* (2013.01); *C09K 2205/22* (2013.01); *C09K 2205/24* (2013.01); *C10M 129/72* (2013.01); *C10M 2207/026* (2013.01); *C10M 2207/042* (2013.01); *C10M 2209/043* (2013.01); *C10M 2223/041* (2013.01); *C10N 2220/022* (2013.01); *C10N 2220/302* (2013.01); *C10N 2230/06* (2013.01); *C10N 2230/10* (2013.01); *C10N 2240/30* (2013.01); *F04C 2210/26* (2013.01); *F04C 2210/263* (2013.01)

(58) Field of Classification Search
CPC ...... C10M 2223/041; C10M 2209/043; C10M 2207/042; C10M 2207/026; C10M 129/68; C10M 137/04; C10M 105/38; C10M 169/04; C10M 129/18; C10M 107/24; C10M 129/72; F04C 18/0215; F04C 29/023; F04C 2210/263; F04C 29/025; F04C 29/04; F04C 2210/26; F25B 1/00; F25B 1/04; C09K 2205/24; C09K 2205/22; C09K 2205/126; C09K 5/04; C09K 5/045; C09K 5/041; C10N 2240/30; C10N 2230/10; C10N 2230/06; C10N 2220/302; C10N 2220/022
See application file for complete search history.

(56) References Cited

U.S. PATENT DOCUMENTS

| | | | |
|---|---|---|---|
| 2004/0110859 A1* | 6/2004 | Biro | C08F 22/40 522/100 |
| 2010/0038583 A1 | 2/2010 | Shimomura et al. | |
| 2012/0329689 A1* | 12/2012 | Rebrovic | C09K 5/045 508/273 |
| 2013/0200295 A1 | 8/2013 | Rebrovic et al. | |
| 2015/0252281 A1* | 9/2015 | Saito | C09K 5/04 252/68 |
| 2015/0338143 A1 | 11/2015 | Sakai et al. | |
| 2015/0376543 A1 | 12/2015 | Saito et al. | |
| 2016/0201678 A1* | 7/2016 | Kouno | F04C 23/008 418/55.1 |
| 2017/0015935 A1 | 1/2017 | Takahashi et al. | |
| 2017/0146265 A1* | 5/2017 | Fujitaka | C09K 5/045 |
| 2017/0218292 A1 | 8/2017 | Konno | |
| 2017/0240834 A1* | 8/2017 | Takahashi | C10M 105/38 |
| 2017/0327759 A1* | 11/2017 | Takahashi | C10M 105/38 |
| 2018/0037836 A1 | 2/2018 | Takahashi et al. | |
| 2018/0201867 A1 | 7/2018 | Saito et al. | |

FOREIGN PATENT DOCUMENTS

| | | | |
|---|---|---|---|
| JP | 2008208262 A | * | 9/2008 |
| JP | 4836305 B2 | | 12/2011 |
| JP | 2016-156297 A | | 9/2016 |
| KR | 10-2015-0116824 A | | 10/2015 |
| TW | 201540826 A | | 11/2015 |
| TW | 201623596 A | | 7/2016 |
| WO | 2008/105256 A1 | | 9/2008 |
| WO | 2015/140869 A1 | | 9/2015 |
| WO | 2015/178233 A1 | | 11/2015 |
| WO | 2016/140187 A1 | | 9/2016 |

OTHER PUBLICATIONS

Taiwanese Office action received in corresponding Taiwanese Application No. 106138017 dated Dec. 25, 2018.
International Search Report of PCT/JP2017/037643 dated Dec. 19, 2017.
Korean Office Action received in corresponding Korean Application No. 10-2018-7030502 dated Dec. 9, 2019.
Extended European Search Report received in corresponding European Application No. 17866627.7 dated Feb. 19, 2020.

* cited by examiner

ELECTRIC COMPRESSOR, AND REFRIGERATION AIR-CONDITIONING APPARATUS

CROSS-REFERENCE TO RELATED APPLICATION

This application is a continuation application of PCT/JP2017/037643, filed on Oct. 18, 2017, which claims priority to Japanese Patent Application No. 2016-215951, filed on Nov. 4, 2016, the contents of which are hereby incorporated by reference in their entireties.

BACKGROUND

1. Technical Field

The present disclosure relates to an electric compressor and a refrigeration air-conditioning apparatus.

2. Description of the Related Art

As desirable refrigerants used in refrigeration air-conditioning apparatuses such as air conditioners and refrigerating and freezing showcases, hydrofluorocarbons attract attention from reasons of thermophysical properties, low global warming potential (GWP), low toxicity, low combustibility, and the like.

There has been known an air conditioner in which a hydrofluorocarbon-based refrigerant including R32 (difluoromethane) as the main component and polyvinyl ether oil as a refrigerator oil are used (for example, see Japanese Patent No. 4836305). According to this air conditioner, polyvinyl ether oil absorbs moisture in a refrigerating circuit, thereby enabling improvement of electrical insulating properties in an electric motor of an electric compressor.

SUMMARY

An electric compressor according to an embodiment of the present disclosure includes, in a sealed container, a compression mechanism to compress a refrigerant and an electric motor to drive the compression mechanism, wherein the refrigerant contains 20% by mass or more of hydrofluoroolefin, and a refrigerator oil stored in the sealed container contains; polyvinyl ether as a base oil; an alicyclic epoxy compound in an amount of 0.1% by mass or more and 2.0% by mass or less relative to the base oil; an aliphatic epoxy compound in an amount of 0.1% by mass or more and 2.0% by mass or less relative to the base oil; and tertiary phosphate in an amount of 0.1% by mass or more and 2.0% by mass or less relative to the base oil.

DESCRIPTION OF THE EMBODIMENTS

Figure 1:
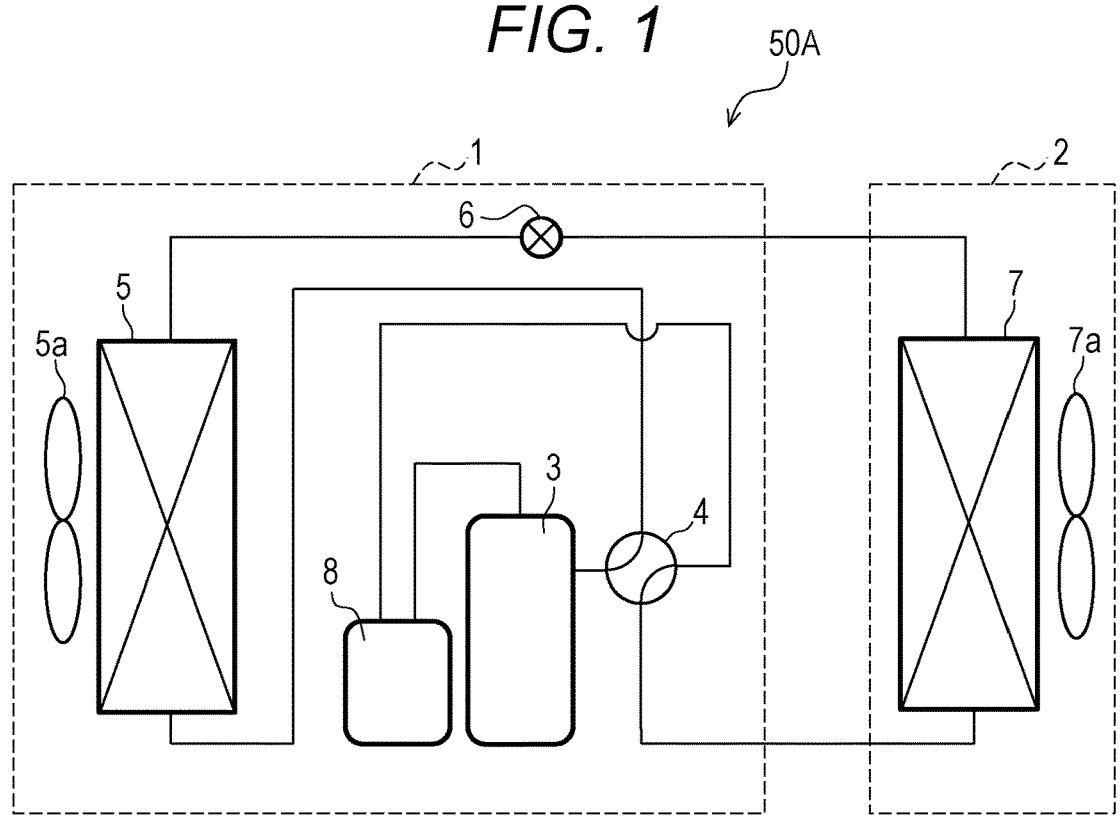
FIG. 1 is an illustrative configuration diagram of an air conditioner (refrigeration air-conditioning apparatus) according to an embodiment of the present embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It is noted that in a large-sized refrigeration air-conditioning apparatus including a relatively large filling amount of a refrigerant, it is desirable to use hydrofluoroolefin having better low combustibility (incombustibility) among the above-described hydrofluorocarbons.

However, the use of the above-described polyvinyl ether oil as a refrigerator oil reduces the thermochemical stability of hydrofluoroolefin.

Also, polyvinyl ether oil is relatively poor in lubrication performance Therefore, the friction loss of the electric compressor increases. Especially, in an electric compressor including a bearing having a rolling mechanism, the fatigue life of the bearing also decreases. To address this concern, polyvinyl ether oil is usually used in combination with tertiary phosphate as a lubricity improver (an extreme-pressure adding agent).

However, when polyvinyl ether oil and tertiary phosphate are used in combination in the presence of hydrofluoroolefin, a problem is raised in that the tertiary phosphate is decomposed and consumed. Thus, there has been a problem in that the electric compressor cannot obtain sufficient product reliability.

A problem addressed by the present disclosure is to provide an electric compressor and a refrigeration air-conditioning apparatus which include, as a refrigerant, hydrofluoroolefin having a small environmental load, and furthermore can maintain favorable product reliability.

The electric compressor according to the present disclosure having solved the above-described problems includes, in a sealed container, a compression mechanism to compress a refrigerant, a rotation axis to drive the compression mechanism, and a bearing to support the rotation axis, in which the refrigerant contains 20% by mass or more of hydrofluoroolefin, the bearing is a rolling bearing, a refrigerator oil stored in the sealed container is polyvinyl ether oil, and the refrigerator oil contains an alicyclic epoxy compound, an aliphatic epoxy compound, and tertiary phosphate, each in an amount of 0.1% by mass or more and 2.0% by mass or less.

Also, the refrigeration air-conditioning apparatus according to the present disclosure having solved the above-described problems includes the electric compressor.

According to the present embodiment, there can be provided an electric compressor and a refrigeration air-conditioning apparatus which include, as a refrigerant, hydrofluoroolefin having a small environmental load, and furthermore can maintain favorable product reliability.

Next, an embodiment (the present embodiment) of the present disclosure will be described with reference to the drawings as appropriate.

The electric compressor according to the present embodiment is mainly characterized in that there are used a refrigerant containing 20% by mass or more of hydrofluoroolefin and polyvinyl ether oil as a refrigerator oil containing an alicyclic epoxy compound, an aliphatic epoxy compound, and tertiary phosphate, each in an amount of 0.1% by mass or more and 2.0% by mass or less. Also, the refrigeration air-conditioning apparatus according to the present embodiment is mainly characterized by including the electric compressor.

Hereinafter, the entire configuration of the refrigeration air-conditioning apparatus will be described with an air conditioner and a refrigerating and freezing showcase as examples, and thereafter, the electric compressor as well as the refrigerant and refrigerator oil used in the electric compressor will be described in detail.

<Air Conditioner>

FIG. 1 is an illustrative configuration diagram of an air conditioner 50A as the refrigeration air-conditioning apparatus.

As illustrated in FIG. 1, the air conditioner 50A includes an outdoor unit 1 and an indoor unit 2.

The outdoor unit 1 is configured such that an electric compressor 3, a four-way valve 4, an expansion means 6 (an expansion portion), an outdoor heat exchanger 5, and an accumulator 8 are connected through prescribed piping.

The electric compressor 3 includes a compression mechanism 33 (see FIG. 3) for refrigerants which has a sliding portion and which is driven by an electric motor 24 (see FIG. 3) as described in detail later.

The indoor unit 2 includes an indoor heat exchanger 7.

It is noted that the refrigerant used in the present embodiment and the refrigerator oil stored in this electric compressor 3 will be described in detail together with the electric compressor 3 described later.

This air conditioner 50A is configured as a heat pump system which performs a cooler operation of switching the four-way valve 4 to use the indoor heat exchanger 7 as an evaporator and the outdoor heat exchanger 5 as a condenser, and a heater operation of using the indoor heat exchanger 7 as a condenser and the outdoor heat exchanger 5 as an evaporator.

For example, in the air conditioner 50A during the cooler operation, a high-temperature, high-pressure refrigerant compressed in the electric compressor 3 passes through the four-way valve 4 and enters the outdoor heat exchanger 5 to dissipate heat for condensation through the heat exchange with an air flow generated in an axial fan 5a. Thereafter, the refrigerant is subjected to isenthalpic expansion by the expansion means 6 to become a low-temperature, low-pressure gas-liquid two-phase flow containing a mixture of a gas refrigerant and a liquid refrigerant, and enters the indoor heat exchanger 7.

An air flow generated by a cross-flow fan 7a exchanges heat with the liquid refrigerant flowing through the indoor heat exchanger 7. The liquid refrigerant in the indoor heat exchanger 7 volatilizes into a gas refrigerant by the endothermic effect from the air. In brief, the indoor heat exchanger 7 cools the air around the indoor heat exchanger 7 while the liquid refrigerant volatilizes, so that the air conditioner 50A exerts a cooling function.

Subsequently, the refrigerant in a state of low-temperature gas having exited the indoor heat exchanger 7 passes through the four-way valve 4, and enters the accumulator 8. The low-temperature, low-pressure liquid refrigerant which could not evaporate in the indoor heat exchanger 7 is isolated in the accumulator 8, and the refrigerant as low-temperature, low-pressure gas returns to the electric compressor 3. Thereafter, this refrigerant is compressed into a high-temperature, high-pressure state again in the electric compressor 3, and circulates through the four-way valve 4, the outdoor heat exchanger 5, the expansion means 6, and the indoor heat exchanger 7. In brief, this circulation is repeated thereby to configure a refrigerating cycle.

Also, in the air conditioner 50A during the heater operation, the flow of the refrigerant is changed into a direction opposite the direction during the cooler operation by switching the four-way valve 4. Accordingly, the high-temperature, high-pressure refrigerant compressed in the electric compressor 3 passes through the four-way valve 4, and enters the indoor heat exchanger 7. The high-temperature, high-pressure refrigerant dissipates heat for condensation by the heat exchange with an air flow generated in the cross-flow fan 7a. In brief, the indoor heat exchanger 7 heats the air around the indoor heat exchanger 7, so that the air conditioner 50A exerts a heating function.

<Refrigerating and Freezing Showcase>

Figure 2:
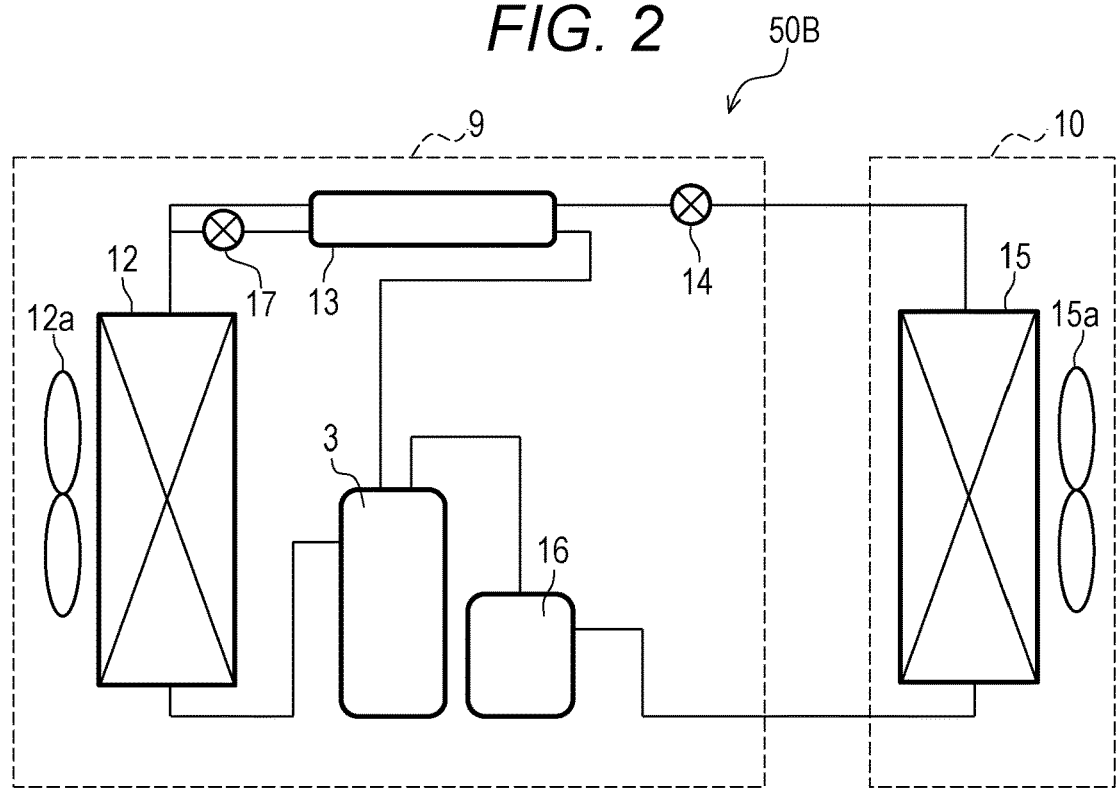
FIG. 2 is an illustrative configuration diagram of a refrigerating and freezing showcase (refrigeration air-conditioning apparatus) according to an embodiment of the present embodiment.

FIG. 2 is an illustrative configuration diagram of a refrigerating and freezing showcase 50B according to an embodiment of the present embodiment.

As illustrated in FIG. 2, the refrigerating and freezing showcase 50B includes an outdoor unit 9 and a cooler 10.

The outdoor unit 9 is configured such that the electric compressor 3, a condenser 12, a supercooler 13, expansion means 14 and 17 (expansion portions), and an accumulator 16 are connected through prescribed piping.

The electric compressor 3 includes the compression mechanism 33 (see FIG. 3) for refrigerants which has a sliding portion and which is driven by the electric motor 24 (see FIG. 3) as described in detail later.

The cooler 10 includes an evaporator 15.

In this refrigerating and freezing showcase 50B, a high-temperature, high-pressure refrigerant gas adiabatically compressed by the electric compressor 3 is sent out into the condenser 12 through a discharge pipe 28 (see FIG. 3), and dissipates heat for condensation by the heat exchange with an air flow generated in an axial fan 12a. The refrigerant having condensed to become high-pressure liquid in the condenser 12 is sent out to the supercooler 13 for supercooling. The supercooled refrigerant sent out from the supercooler 13 expands by the expansion means 14 (for example, a thermal expansion valve) to become low-temperature, low-pressure liquid slightly containing gas, and is sent out into the evaporator 15 of the cooler 10.

An air flow generated by a cross-flow fan 15a of the cooler 10 exchanges heat with the refrigerant having become low-temperature, low-pressure liquid flowing through the evaporator 15. The refrigerant in the evaporator 15 volatilizes into a gas refrigerant by the endothermic effect from the air. In brief, the evaporator 15 cools the air around the evaporator 15 while the liquid refrigerant volatilizes, so that the refrigerating and freezing showcase 50B exerts a refrigerating and freezing function.

The refrigerant having absorbed heat from the air in the evaporator 15 enters the accumulator 16 in the state of low-temperature gas. The low-temperature, low-pressure liquid refrigerant which could not evaporate in the evaporator 15 is isolated in the accumulator 16, and the refrigerant as low-temperature, low-pressure gas returns to the electric compressor 3. Thereafter, this refrigerant is compressed into a high-temperature, high-pressure state again in the electric compressor 3, and circulates through the condenser 12, the supercooler 13, the expansion means 14, and the evaporator 15. In brief, this circulation is repeated thereby to configure a refrigerating cycle.

It is noted that the electric compressor 3 used in the refrigerating and freezing showcase 50B according to the present embodiment has a refrigerant compression ratio of as high as about 10 to 20. Thus, the temperature of the refrigerant gas is likely to become high. Therefore, in the refrigerating and freezing showcase 50B, the piping from the condenser 12 toward the supercooler 13 is bifurcated, and the expansion means 17 (for example, a capillary tube) is disposed in one of the bifurcated branches.

Furthermore, in the refrigerating and freezing showcase 50B according to the present embodiment, a high-pressure liquid refrigerant in a main circuit is further cooled in the supercooler 13 by obtaining low-temperature, low-pressure liquid containing a refrigerant gas through the expansion means 17. In the refrigerating and freezing showcase 50B, the refrigerant cooled in the supercooler 13 returns to the electric compressor 3, thereby to decrease the temperature of the inhaled refrigerant and lower the discharge temperature.

<Electric Compressor>

Next, the electric compressor 3 used in the air conditioner 50A (see FIG. 1) and the refrigerating and freezing showcase 50B (see FIG. 2) having been described as the refrigeration air-conditioning apparatus according to the present embodiment will be described in further detail. It is noted that the electric compressor 3 according to the present embodiment is assumed to be a scroll-type compressor.

Figure 3:
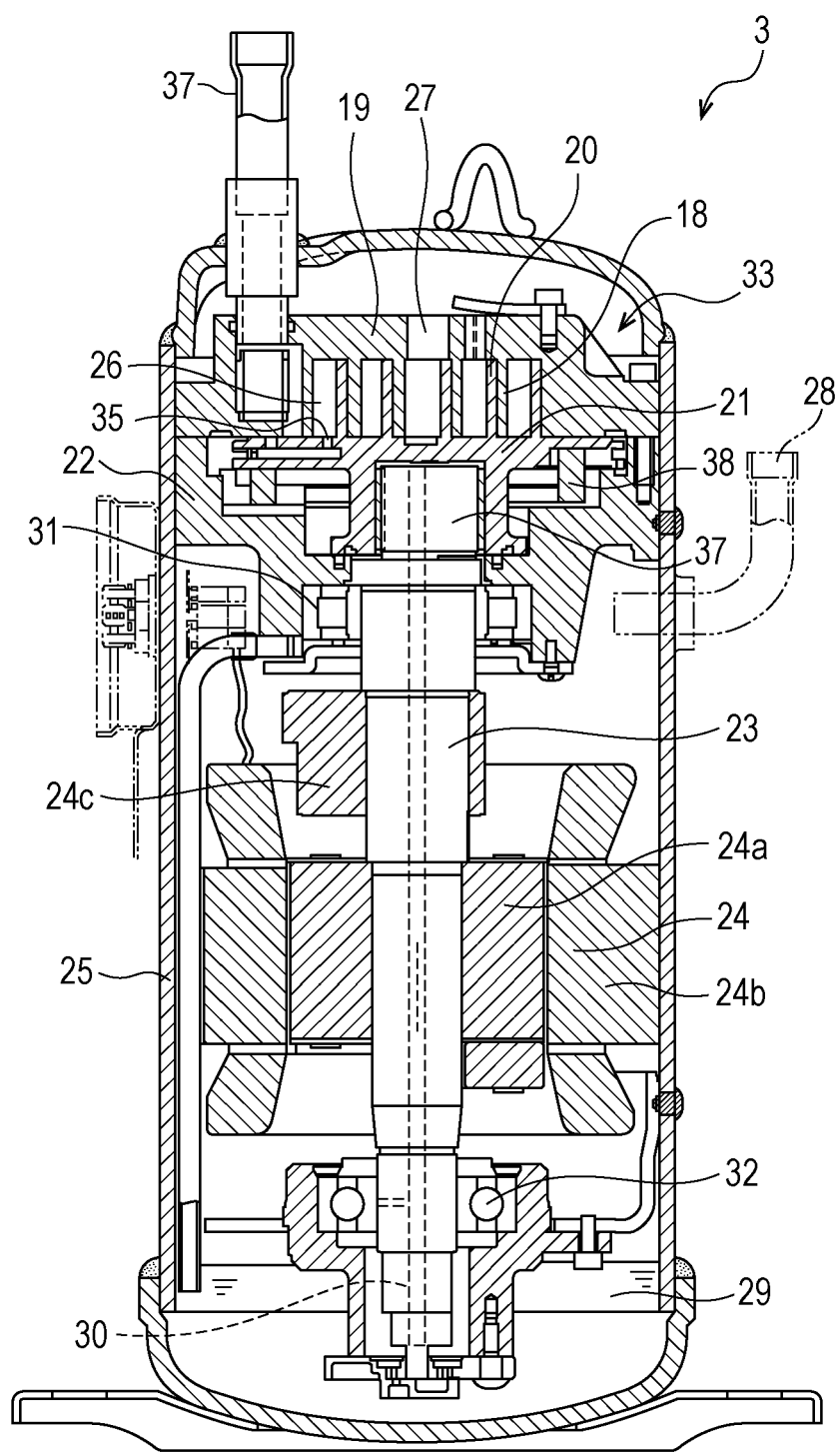
FIG. 3 is a vertical cross-sectional diagram of an electric compressor according to an embodiment of the present embodiment.

FIG. 3 is a vertical cross-sectional diagram of the electric compressor 3 according to the present embodiment.

As illustrated in FIG. 3, the electric compressor 3 includes, as a main constituent, a sealed container 25, the compression mechanism 33, and the electric motor 24.

The compression mechanism 33 and the electric motor 24 are housed in a sealed space of the sealed container 25. Also, a refrigerator oil 29 (hereinafter, the reference sign of the refrigerator oil will be omitted) described in detail later is stored in the bottom of the sealed container 25.

The compression mechanism 33 compresses a refrigerant gas described in detail later and discharges the compressed refrigerant gas into the sealed container 25, and is disposed at the upper side in the sealed container 25.

The compression mechanism 33 includes, as a main constituent, a fixed scroll member 19, a revolving scroll member 21, a frame 22, and an Oldham ring 38.

The fixed scroll member 19 includes a spiral wrap 18 on an end plate, and is bolted on the frame 22. The revolving scroll member 21 includes, on an end plate, a spiral wrap 20 to mesh with the spiral wrap 18 of the fixed scroll member 19. These spiral wraps 18 and 20 mesh with each other thereby to form a compression chamber 26.

It is noted that the revolving scroll member 21 and the fixed scroll member 19 in the present embodiment are assumed to be formed with aluminum alloy.

A suction port 35 in communication with a suction pipe 37 is disposed around the outer edge of the fixed scroll member 19, and a discharge port 27 is disposed in the center of the fixed scroll member 19. This discharge port 27 communicates with a space above the compression mechanism 33 inside the sealed container 25.

A boss portion in which a revolving bearing is to be incorporated is disposed opposite the fixed scroll member 19 of the revolving scroll member 21. An eccentric pin portion to eccentrically drive the revolving scroll member 21 is fitted into this revolving bearing.

The Oldham ring 38 constitutes a rotation regulating mechanism of the revolving scroll member 21. The Oldham ring 38 is disposed between the revolving scroll member 21 and the frame 22, and controls the rotation of the revolving scroll member 21 in revolution and causes the revolving scroll member 21 to perform circular orbit motion.

The frame 22 in the present embodiment is welded and fixed to the sealed container 25. This frame 22 supports the fixed scroll member 19, the Oldham ring 38, and the revolving scroll member 21. A tube portion projecting downward is disposed in the center of the frame 22. A main bearing 31 to pivotally support a crankshaft 23 is disposed in this tube portion.

A plurality of discharge gas passages (not illustrated) communicating between a space above the fixed scroll member 19 and a space below the frame 22 is formed on the outer circumference of the fixed scroll member 19 and the frame 22.

The electric motor 24 includes, as a main constituent, a rotor 24a, a stator 24b, the crankshaft 23, and a balance weight 24c.

The stator 24b includes, as a main constituent, a coil having a plurality of conductors for allowing an electrical current to flow through and generating a rotating magnetic field, and an iron core for efficiently transmitting the rotating magnetic field.

A plurality of notches is formed on an entire outer circumference of the stator 24b, and a discharge gas passage is formed between these notches and the sealed container 25.

The crankshaft 23 is fitted into a center hole of the rotor 24a and unified with the rotor 24a. One side (the upper side in the illustrated example) of the crankshaft 23 projects from the rotor 24a and engages with the compression mechanism 33, and eccentric force is applied to the crankshaft 23 by the compression action of the compression mechanism 33. In the present embodiment, both sides of the crankshaft 23 project from both sides of the rotor 24a, and the crankshaft 23 is pivotally supported by the main bearing 31 and a sub-bearing 32 on both sides of the rotor 24a thereby enabling stable rotation.

It is noted that the main bearing 31 and the sub-bearing 32 in the present embodiment are constituted by a rolling bearing.

The lower end of the crankshaft 23 reaches a refrigerator oil reservoir on the bottom of the sealed container 25. By pressure difference, the refrigerator oil passes through an oil hole 30 disposed to the crankshaft 23, and is supplied to a sliding portion between the revolving scroll member 21 and the crankshaft 23, the main bearing 31 and the sub-bearing 32 constituted by a rolling bearing, and the like.

In the above-described electric compressor 3, the electric motor 24 is energized so that the rotor 24a rotates. The rotor 24a rotates at a constant speed or at a rotation speed depending on the voltage controlled by an unillustrated inverter. The crankshaft 23 rotates in synchronism with the rotation of the rotor 24a. Accordingly, the revolving scroll member 21 is eccentrically driven as described above. The volume of the compression chamber 26 formed between the fixed scroll member 19 and the revolving scroll member 21 is decreased while the compression chamber 26 is moving from the outer circumferential side toward the center. The refrigerant gas sucked through the suction pipe 37 and the suction port 35 is compressed in the compression chamber 26. The compressed refrigerant gas is discharged from the discharge port 27 at the center of the fixed scroll member 19 into an upper space (a discharge pressure space) inside the sealed container 25, and thereafter emitted outside the sealed container 25 through the discharge pipe 28.

<Refrigerant>

In the electric compressor 3 according to the present embodiment, a refrigerant containing 20% by mass or more of hydrofluoroolefin is used.

The hydrofluoroolefin is preferably, but not particularly limited to, 2,3,3,3-tetrafluoropropene (HFO1234yf), 1,3,3,3-tetrafluoropropene (HFO1234ze), trifluoroethene (HFO1123), and 3,3,3-trifluoropropene (HFO1243zf). One of these hydrofluoroolefins may be used, or two or more thereof may be used in combination.

Although the refrigerant in the present embodiment may be constituted by only hydrofluoroolefin, a mixed refrigerant containing 80% by mass or less of a refrigerant other than the hydrofluoroolefin can also be used.

Examples of the refrigerant other than the hydrofluoroolefin constituting the mixed refrigerant includes, but not limited to, difluoromethane, 1,1,2,2,2-pentafluoroethane, 1,1,1,2,2-pentafluoroethane, 1,1,1,2-tetrafluoroethane, 1,1,1-trifluoroethane, monofluoroethane, and difluoroethane. One of these refrigerants other than the hydrofluoroolefin or a combination of two or more thereof can be used for constituting a mixed refrigerant with hydrofluoroolefin.

Examples of a combination between hydrofluoroolefin and a refrigerant other than the hydrofluoroolefin preferably include, but not particularly limited to: a mixed refrigerant of 2,3,3,3-tetrafluoropropene and difluoromethane; a mixed refrigerant of 1,3,3,3-tetrafluoropropene and difluoromethane; a mixed refrigerant of 2,3,3,3-tetrafluoropropene, difluoromethane, and 1,1,1,2,2-pentafluoroethane; a mixed refrigerant of 2,3,3,3-tetrafluoropropene, difluoromethane, and 1,1,2,2,2-pentafluoroethane; a mixed refrigerant of 2,3,3,3-tetrafluoropropene, difluoromethane, 1,1,1,2,2-pentafluoroethane, and 1,1,2,2,2-pentafluoroethane; a mixed refrigerant of 2,3,3,3-tetrafluoropropene, difluoromethane, 1,1,1,2,2-pentafluoroethane, and 1,1,1,2-tetrafluoroethane; a mixed refrigerant of 2,3,3,3-tetrafluoropropene, difluoromethane, 1,1,2,2,2-pentafluoroethane, and 1,1,1,2-tetrafluoroethane; a mixed refrigerant of 2,3,3,3-tetrafluoropropene, difluoromethane, 1,1,1,2,2-pentafluoroethane, 1,1,2,2,2-pentafluoroethane, and 1,1,1,2-tetrafluoroethane; a mixed refrigerant of 2,3,3,3-tetrafluoropropene, 1,3,3,3-tetrafluoropropene, difluoromethane, 1,1,1,2,2-pentafluoroethane, and 1,1,1,2-tetrafluoroethane; a mixed refrigerant of 2,3,3,3-tetrafluoropropene, 1,3,3,3-tetrafluoropropene, difluoromethane, 1,1,2,2,2-pentafluoroethane, and 1,1,1,2-tetrafluoroethane; a mixed refrigerant of 2,3,3,3-tetrafluoropropene, 1,3,3,3-tetrafluoropropene, 1,1,1,2,2-pentafluoroethane, 1,1,2,2,2-pentafluoroethane, and 1,1,1,2-tetrafluoroethane; and a mixed refrigerant of trifluoroethene and difluoromethane.

<Refrigerator Oil>

The refrigerator oil in the present embodiment includes polyvinyl ether oil as a base oil, an alicyclic epoxy compound, an aliphatic epoxy compound, and tertiary phosphate.

(Polyvinyl Ether Oil)

The polyvinyl ether oil in the present embodiment contains polyvinyl ether represented by formula (1) below.

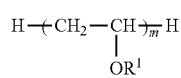

(In (1), $R^1$ is an alkyl group of 1 to 4 carbon atoms, and m is an integer of 5 to 15. Also, $R^1$'s of m vinyl ether units may independently be the same as or different from each other, and bonding between the vinyl ether units may be either a random bond or a block bond.)

Examples of the alkyl group represented by $R^1$ in formula (1) include a methyl group, an ethyl group, a propyl group, an isopropyl group, a butyl group, an isobutyl group, a sec-butyl group, and a tert-butyl group.

The kinematic viscosity (40° C.) of the polyvinyl ether oil in the present embodiment in which a scroll-type compressor is assumed is preferably 46 to 84 mm$^2$/s. Also, the kinematic viscosity of the polyvinyl ether oil can be appropriately changed depending on the type of an applied electric compressor. For example, the kinematic viscosity (40° C.) of the polyvinyl ether oil applied in a rotary-type compressor can be set at 32 to 74 mm$^2$/s.

It is noted that the viscosity pressure coefficient (40° C.) of the polyvinyl ether oil in the present embodiment is assumed to be 11 GPa$^{-1}$ or more. Particularly, polyvinyl ether oil having a viscosity pressure coefficient (40° C.) of not less than 15.1 GPa$^{-1}$ is more preferable.

(Alicyclic Epoxy Compound)

An example of the alicyclic epoxy compound in the present embodiment may include a compound in which carbon atoms constituting an epoxy group directly constitute an alicyclic ring.

Examples of such an alicyclic epoxy compound may include, but not limited to, 1,2-epoxycyclohexane, 1,2-epoxycyclopentane, 3,4-epoxycyclohexylmethyl-3,4-epoxycyclohexanecarboxylate, bis(3,4-epoxycyclohexylmethyl)adipate, exo-2,3-epoxynorbornane, bis(3,4-epoxy-6-methylcyclohexylmethyl)adipate, 2-(7-oxabicyclo[4.1.0]hept-3-yl)-spiro(1,3-dioxane-5,3'-[7]oxabicyclo[4.1.0]heptane, 4-(1'-methylepoxyethyl)-1,2-epoxy-2-methylcyclohexane, and 4-epoxyethyl-1,2-epoxycyclohexane. One of these alicyclic epoxy compounds may be used, or two or more thereof may be used in combination.

Among these, 3,4-epoxycyclohexylmethyl-3,4-epoxycyclohexanecarboxylate represented by formula (2) below is preferable.

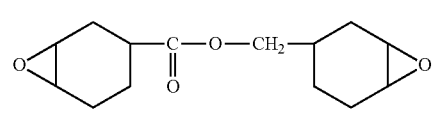

In the refrigerator oil according to the present embodiment, the alicyclic epoxy compound is contained in an amount of 0.1 to 2.0% by mass relative to the polyvinyl ether oil (base oil).

(Aliphatic Epoxy Compound)

Examples of the aliphatic epoxy compound in the present embodiment may include an alkyl glycidyl ester compound and an alkyl glycidyl ether compound.

An example of the alkyl glycidyl ester compound may include a compound represented by formula (3) below.

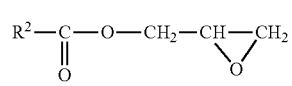

(In formula (3), $R^2$ is an alkyl group of 4 to 12 carbon atoms.)

The alkyl group represented by $R^2$ in formula (3) may have either a linear structure or a branched structure. Examples of such an alkyl group may include, but not limited to, a butyl group, an isobutyl group, a sec-butyl group, a tert-butyl group, a pentyl group, a hexyl group, a heptyl group, an octyl group, an isopropyl group, an isopentyl group, a neopentyl group, a tert-pentyl group, an isohexyl group, and a 2-ethylhexyl group.

An example of the alkyl glycidyl ether compound may include a compound represented by formula (4) below.

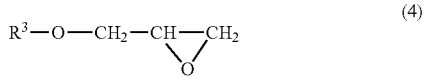

(In formula (4), $R^3$ is an alkyl group of 4 to 12 carbon atoms.)

Examples of the alkyl group represented by $R^3$ in formula (4) may include alkyl groups similar to the alkyl group represented by $R^2$ in formula (3).

Also, another example of the aliphatic epoxy compound to be used in the present embodiment may include a glycidyl ether compound of polyhydric alcohol such as glycerol, sorbitol, and polyglycerol.

Examples of such an aliphatic epoxy compound may include, but not limited to, glycerol diglycidyl ether, glycerol triglycidyl ether, polyglycerol polyglycidyl ether, sorbitol polyglycidyl ether, trimethylolpropane polyglycidyl ether, and pentaerythritol polyglycidyl ether.

Among the aliphatic epoxy compounds, the alkyl glycidyl ester compound and the alkyl glycidyl ether compound are preferable.

One of the above-described aliphatic epoxy compounds may be used, or two or more thereof may be used in combination.

In the refrigerator oil according to the present embodiment, the aliphatic epoxy compound is contained in an amount of 0.1 to 2.0% by mass relative to the polyvinyl ether oil (base oil).

(Tertiary Phosphate)

Examples of the tertiary phosphate (orthophosphate ester) in the present embodiment may include, but not limited to, tricresyl phosphate, triphenyl phosphate and a derivative thereof, trixylenyl phosphate, cresyl diphenyl phosphate, 2-ethylhexyl diphenyl phosphate, and tris(2-ethylhexyl) phosphate. Among these, preferable tertiary phosphate is tricresyl phosphate.

One of the above-described tertiary phosphates may be used, or two or more thereof may be used in combination.

In the refrigerator oil according to the present embodiment, the tertiary phosphate is contained in an amount of 0.1 to 2.0% by mass relative to the polyvinyl ether oil (base oil).

(Other Components)

The refrigerator oil in the present embodiment can further contain, as necessary, a lubricity improver, an antioxidants, an acid capture agent, an antifoaming agent, and a metal deactivator. As an antioxidant, phenol-based DBPC (2,6-di-t-butyl-p-cresol) is preferable.

Next, features and advantageous effects exerted by the present embodiment will be described.

The refrigerator oil used in the refrigeration air-conditioning apparatuses such as the air conditioner 50A (see FIG. 1) and the refrigerating and freezing showcase 50B (see FIG. 2) plays a role in lubrication, sealing, cooling, and the like in the sliding portion of the electric compressor 3 (see FIG. 3).

Also, in the electric compressor 3, the use of a rolling bearing as the main bearing 31 and the sub-bearing 32 (see FIG. 3) can reduce friction loss and improve an annual performance factor (APF).

As a refrigerator oil, polyvinyl ether having excellent electrical insulation has been widely used (for example, see Patent Document 1).

However, when polyvinyl ether is used as a refrigerator oil in a refrigeration air-conditioning apparatus in which hydrofluoroolefin having a small environmental load is used as a refrigerant, the thermochemical stability of the hydrofluoroolefin decreases. For this reason, polyvinyl ether cannot be used as a refrigerator oil in the refrigeration air-conditioning apparatus in which hydrofluoroolefin is used.

Also, since polyvinyl ether has poor lubricity, tertiary phosphate needed to be added for the purpose of improving this lubricity.

However, since tertiary phosphate is decomposed and consumed in the coexistence of hydrofluoroolefin and polyvinyl ether, favorable performance of a refrigerator oil cannot be maintained.

Therefore, it is considered to use, as a refrigerator oil, polyol ester exhibiting favorable lubricity without formulating an additive such as tertiary phosphate, in place of polyvinyl ether.

However, polyol ester has a problem in that the viscosity pressure coefficient is small. Therefore, there is a problem that the use of polyol ester in an electric compressor containing a rolling bearing reduces the fatigue life of the rolling bearing, with the result that vibration and noise due to flaking are caused in an early period.

Also, in an electric compressor including an aluminum alloyed spiral wrap for the purpose of increasing the efficiency of a scroll compressor, there is another problem that polyol ester causes a tribochemical reaction leading to drastic wear between spiral wraps.

On the contrary, in the electric compressor 3 according to the present embodiment, the refrigerant contains 20% by mass or more of hydrofluoroolefin, and the refrigerator oil contains polyvinyl ether as a base oil, an alicyclic epoxy compound in an amount of 0.1% by mass or more and 2.0% by mass or less relative to the base oil, an aliphatic epoxy compound in an amount of 0.1% by mass or more and 2.0% by mass or less relative to the base oil, and tertiary phosphate in an amount of 0.1% by mass or more and 2.0% by mass or less relative to the base oil.

According to such an electric compressor 3 of the present embodiment, the use of the refrigerator oil having the above-described composition can suppress the decomposition and consumption of hydrofluoroolefin and tertiary phosphate. The favorable lubrication performance of the refrigerator oil can be maintained. This reduces the friction loss of the electric compressor 3, thereby increasing the operational efficiency. Furthermore, the wear in the sliding portion is suppressed, thereby improving the reliability and extending the useful life of the electric compressor 3.

Also, the viscosity pressure coefficient (40° C.) of the polyvinyl ether oil in the present embodiment is assumed to be 11 $GPa^{-1}$ or more. Accordingly, the main bearing 31 (see FIG. 3) and the sub-bearing 32 (see FIG. 3), both constituted by a rolling bearing, of the electric compressor 3 according to the present embodiment can have extended fatigue life and suppress the occurrence of the vibration and noise due to flaking, unlike when polyol ester is used as described above.

Also, according to the electric compressor 3 of the present embodiment, the use of polyvinyl ether oil can suppress a tribochemical reaction between the aluminum alloyed spiral wraps 18 and 20, unlike when the polyol ester is used. This can suppress the reduction on the friction surface in association with the tribochemical reaction. Accordingly, the wear in the sliding portion is suppressed, thereby improving the reliability and extending the useful life of the electric compressor 3.

Also, according to the air conditioner 50A and the refrigerating and freezing showcase 50B (refrigeration air-conditioning apparatuses) including the electric compressor 3 of the present embodiment, the electric compressor 3 exerts the above-described features and advantageous effects, thereby further improving product reliability.

Although the present embodiment has been described above, the present disclosure is not limited to the above-described embodiment, and can be carried out according to various modes.

erant illustrated in Table 1 indicates a ratio (%) of HFO1234yf, HFO1234ze, or HFC32 in the refrigerant. That is, in Reference Example 1 to Reference Example 10, and Reference Example 14, a refrigerant containing 20% by mass or more of hydrofluoroolefin is used.

It is noted that HFO1234yf is 2,3,3,3-tetrafluoropropene, and HFO1234ze is 1,3,3,3-tetrafluoropropene.

TABLE 1

| | | Refrigerant | | | Refrigerator oil | Kinematic viscosity (40° C.) (mm²/s) | Total acid number (mgKOH/g) | Fluorine amount in oil (ppm) | Metal catalyst appearance |
|---|---|---|---|---|---|---|---|---|---|
| | | HFO1234yf | HFO1234ze | HFC32 | | | | | |
| Reference Example | 1 | 100 | | | A | 67.8 | 2.5 | 7800 | Discolored |
| | 2 | 100 | | | B | 50.7 | 2.8 | 8200 | Discolored |
| | 3 | 100 | | | C | 31.8 | 2.9 | 9100 | Discolored |
| | 4 | | 100 | | A | 67.8 | 2.3 | 1800 | Not discolored |
| | 5 | | 100 | | B | 50.7 | 2.7 | 2100 | Not discolored |
| | 6 | | 100 | | C | 31.8 | 2.2 | 2200 | Not discolored |
| | 7 | 80 | | 20 | A | 67.8 | 2.4 | 7200 | Discolored |
| | 8 | 60 | | 40 | A | 67.8 | 2.2 | 6500 | Discolored |
| | 9 | 40 | | 60 | A | 67.8 | 2.1 | 4300 | Discolored |
| | 10 | 20 | | 80 | A | 67.8 | 1.8 | 1600 | Not discolored |
| | 11 | 10 | | 90 | A | 67.8 | 0.4 | 600 | Not discolored |
| | 12 | | | 100 | A | 67.8 | 0.1 | 30 | Not discolored |
| | 13 | | 10 | 90 | A | 67.8 | 0.2 | 350 | Not discolored |
| | 14 | 10 | 10 | 80 | A | 67.8 | 1.4 | 1300 | Not discolored |
| | 15 | 5 | 5 | 90 | A | 67.8 | 0.1 | 280 | Not discolored |
| | 16 | 100 | | | D | 68.7 | 0.01 | 150 | Not discolored |

Although the electric compressor 3 (see FIG. 3) as a scroll-type electric compressor has been described in the present embodiment, the present disclosure can also be applied to other electric compressors such as a rotary-type compressor, a twin rotary-type compressor, a two-stage compression rotary-type compressor, a swing-type compressor, and a reciprocating compressor.

Also, although the air conditioner 50A (see FIG. 1) and the refrigerating and freezing showcase 50B (see FIG. 2) have been described as the refrigeration air-conditioning apparatus in the above-described embodiment, the present disclosure can also be applied to other refrigeration air-conditioning apparatuses such as a refrigerator, a freezer, and a heat pump-type hot water supply device.

EXAMPLES

Hereinafter, examples in which the features and advantageous effects of the present embodiment has been studied will be described.

First, prior to description for examples of the present embodiment, there will be described reference examples in which it was checked if the use of a refrigerant containing 20% by mass or more of hydrofluoroolefin having a small environmental load and the use of polyvinyl ether as a refrigerator oil reduces the thermochemical stability of hydrofluoroolefin.

Reference Example 1 to Reference Example 10, and Reference Example 14

In Reference Example 1 to Reference Example 10, and Reference Example 14, as illustrated in Table 1, a refrigerant was constituted by one or more selected from two hydrofluoroolefins (HFO1234yf and HFO1234ze) and a difluoromethane (HFC32). The number in each column of Refrig- Also, in Reference Example 1 to Reference Example 10, and Reference Example 14, there were used the following refrigerator oils indicated by (A), (B), and (C) in Table 1 which are the polyvinyl ether represented by formula (1) above.

(A) Daphne Hermetic Oil (registered trademark), polyvinyl ether oil, manufactured by Idemitsu Kosan Co., Ltd.
FVC68 (kinematic viscosity at 40° C.: 67.8 mm²/s)
(B) Daphne Hermetic Oil (registered trademark), polyvinyl ether oil, manufactured by Idemitsu Kosan Co., Ltd.,
FV50 (kinematic viscosity at 40° C.: 50.7 mm²/s)
(C) Daphne Hermetic Oil (registered trademark), polyvinyl ether oil, manufactured by Idemitsu Kosan Co., Ltd.,
FVC32 (kinematic viscosity at 40° C.: 31.8 mm²/s)

In Reference Example 1 to Reference Example 10, and Reference Example 14, there were poured, into a glass container, 60 g of the refrigerator oil having a water content of less than 100 ppm illustrated in Table 1, a metal catalyst, and an antioxidant (DBPC; 2,6-di-t-butyl-p-cresol) in an amount of 0.2% by mass relative to the refrigerator oil, and the glass container was placed in a pressure container. As the metal catalyst, there was used a product obtained by winding an alloy wire (diameter: 2.0, length: 300 mm) containing aluminum, copper, and iron into a coil shape. It is noted that the alloy wire had been previously polished with sandpaper and thereafter washed with acetone and ethanol.

Next, an inside of the pressure container was evacuated to 100 Pa or less. Thereafter, a refrigerant cylinder was connected to the pressure container to introduce 12 g of the refrigerant illustrated in Table 1 into the pressure container.

This pressure container was subjected to heat treatment in a constant temperature bath at 175° C. for 504 hours.

Subsequently, the refrigerator oil and metal catalyst having been subjected to heat treatment were removed from the pressure container, and measured for the total acid number (mgKOH/g) of the refrigerator oil and the fluorine amount (ppm) in the refrigerator oil. The result is illustrated in Table 1. In Table 1, the fluorine amount in the refrigerator oil (fluorine amount in oil) was measured by ion chromatography. Also, the removed metal catalyst surface was visually observed for discoloration. The result is illustrated as "Metal catalyst appearance" in Table 1.

Reference Example 11 to Reference Example 13, and Reference Example 15

In Reference Example 11 to Reference Example 13, and Reference Example 15, the total acid number (mgKOH/g) of the refrigerator oil after heat treatment and the fluorine amount (ppm) in the refrigerator oil were measured, and the metal catalyst surface was visually observed for discoloration, in a manner similar to Reference Example 1 except that a refrigerant containing less than 20% by mass of hydrofluoroolefin (see Table 1) was used. The result is illustrated in Table 1.

Reference Example 16

In Reference Example 16, the following polyol ester indicated by (D) in Table 1 was used as the refrigerator oil, in place of polyvinyl ether.
(D) Hindered-type polyol ester having a kinematic viscosity at 40° C. of 68.7 mm$^2$/s. Except that this refrigerator oil was used, the total acid number (mgKOH/g) of the refrigerator oil after heat treatment and the fluorine amount (ppm) in the refrigerator oil were measured, and the metal catalyst surface was visually observed for discoloration, in a manner similar to Reference Example 1. The result is illustrated in Table 1.

Evaluation Results of Reference Examples

As illustrated in Reference Example 1 to Reference Example 3, the use of a combination between polyvinyl ether (refrigerator oils A, B, and C) and 2,3,3,3-tetrafluoropropene (HFO1234yf) increases the value of the total acid number (initial value: 0.01 mgKOH/g or less) regardless of the value of the kinematic viscosity of the refrigerator oil. Also, the fluorine amount in oil was large, and the metal catalyst was discolored.

Also, as illustrated in Reference Example 4 to Reference Example 6, the use of a combination between polyvinyl ether (refrigerator oils A, B, and C) and 1,3,3,3-tetrafluoropropene (HFO1234ze) increases the value of the total acid number (initial value: 0.01 mgKOH/g or less) regardless of the value of the kinematic viscosity of the refrigerator oil. Also, the fluorine amount in oil was large. It is noted that the discoloration of the metal catalyst was not observed.

As illustrated in Reference Example 7 to Reference Example 10, and Reference Example 14, the use of the refrigerant containing 20% by mass or more of hydrofluoroolefin (HFO1234yf and HFO1234ze) increases the value of the total acid number (initial value: 0.01 mgKOH/g or less). Also, the fluorine amount in oil was large. Also, in Reference Example 7 to Reference Example 9, the metal catalyst was discolored. It is noted that in Reference Example 10 and Reference Example 14, the discoloration of the metal catalyst was not observed.

As illustrated in Reference Example 11, Reference Example 12, and Reference Example 15, when the refrigerant containing less than 20% by mass of hydrofluoroolefin (see Table 1) was used, the total acid number was small, and the fluorine amount in oil was also small. Also, the discoloration of the metal catalyst was not observed.

As illustrated in Reference Example 16, when the polyol ester indicated by (D) in Table 1 was used as the refrigerator oil, the total acid number was small, and the fluorine amount in oil was also small. Also, the discoloration of the metal catalyst was not observed.

As confirmed from the above results, the use of the refrigerant containing 20% by mass or more of hydrofluoroolefin extremely reduces the thermochemical stability with polyvinyl ether.

Example 1 to Example 12, and Comparative Example 1 to Comparative Example 5

In Example 1 to Example 12, and Comparative Example 1 to Comparative Example 5, as illustrated in Table 2, the following additives (V), (X), (Y), and (Z) were added in predetermined amounts (see "Before test (% by mass)" in Table 2) to a refrigerant and a refrigerator oil, and the mixture was subjected to heat treatment in a manner similar to Reference Example 1 to Reference Example 10, and Reference Example 14 described above.

TABLE 2

| | | Refrigerant | Refrigerator oil | Additive Before test (% by mass) | | | | After test (%) | | | | Total acid number (mgKOH/g) | Fluorine amount in oil (ppm) | Metal catalyst appearance |
|---|---|---|---|---|---|---|---|---|---|---|---|---|---|---|
| | | | | V | X | Y | Z | V | X | Y | Z | | | |
| Example | 1 | HFO1234yf | A | 0.1 | 0.5 | | 0.5 | 65 | 85 | | 90 | 0.12 | 1800 | Not discolored |
| | 2 | HFO1234yf | A | 0.5 | 0.5 | | 0.5 | 83 | 83 | | 98 | 0.05 | 1200 | Not discolored |
| | 3 | HFO1234yf | A | 1.0 | 0.5 | | 0.5 | 85 | 89 | | 98 | 0.02 | 780 | Not discolored |
| | 4 | HFO1234yf | A | 2.0 | 0.5 | | 0.5 | 88 | 93 | | 99 | 0.01 | 660 | Not discolored |
| | 5 | HFO1234yf | A | 0.5 | 0.1 | | 0.5 | 78 | 67 | | 97 | 0.06 | 1300 | Not discolored |
| | 6 | HFO1234yf | A | 0.5 | 2.0 | | 0.5 | 83 | 97 | | 96 | 0.02 | 1500 | Not discolored |
| | 7 | HFO1234yf | A | 0.5 | 0.5 | | 0.1 | 86 | 79 | | 93 | 0.01 | 1600 | Not discolored |
| | 8 | HFO1234yf | A | 0.5 | 0.5 | | 2.0 | 72 | 84 | | 97 | 0.11 | 1400 | Not discolored |
| | 9 | HFO1234yf | A | 0.1 | 0.1 | | 0.1 | 57 | 74 | | 91 | 0.15 | 3200 | Not discolored |
| | 10 | HFO1234yf | A | 1.0 | 1.0 | | 1.0 | 89 | 93 | | 96 | 0.08 | 480 | Not discolored |
| | 11 | HFO1234yf | A | 2.0 | 2.0 | | 2.0 | 91 | 88 | | 95 | 0.06 | 370 | Not discolored |
| | 12 | HFO1234yf | A | 0.5 | | 0.5 | 0.5 | 83 | | 63 | 97 | 0.01 | 290 | Not discolored |
| Comparative Example | 1 | HFO1234yf | A | 0.5 | | | 0.5 | 12 | | | 84 | 0.52 | 3200 | Not discolored |
| | 2 | HFO1234yf | A | | 0.5 | | 0.5 | | 5 | | 0 | 1.97 | 6500 | Discolored |
| | 3 | HFO1234yf | A | | | 0.5 | 0.5 | | | 0 | 0 | 2.12 | 5800 | Discolored |

TABLE 2-continued

| | Refrigerant | Refrigerator oil | Additive | | | | | | | | Total acid number (mgKOH/g) | Fluorine amount in oil (ppm) | Metal catalyst appearance |
|---|---|---|---|---|---|---|---|---|---|---|---|---|---|
| | | | Before test (% by mass) | | | | After test (%) | | | | | | |
| | | | V | X | Y | Z | V | X | Y | Z | | | |
| 4 | HFO1234yf | A | 0.05 | 0.5 | | 0.5 | 0 | 20 | | 35 | 0.92 | 4200 | Discolored |
| 5 | HFO1234yf | A | 3.0 | 0.5 | | 0.5 | 45 | 96 | | 99 | 0.01 | 2100 | Not discolored |

It is noted that as illustrated in Table 2, only 2,3,3,3-tetrafluoropropene (HFO1234yf) and the above-described polyvinyl ether of (A) were used as a refrigerant and a refrigerator oil respectively, similar to Reference Example 1.

In Table 2, the additive indicated by (V) is 3,4-epoxycyclohexylmethyl-3,4-epoxycyclohexanecarboxylate, as the alicyclic epoxy compound.

In Table 2, the additive indicated by (X) is 2-ethylhexyl glycidyl ether, as the aliphatic epoxy compound.

In Table 2, the additive indicated by (Y) is constituted by a mixture of alkyl glycidyl ester including an alkyl group of 4 to 9 carbon atoms, as the aliphatic epoxy compound.

In Table 2, the additive indicated by (Z) is tricresyl phosphate, as the tertiary phosphate.

It is noted that "Before test (% by mass)" of the additives (V), (X), (Y), and (Z) in Table 2 is % by mass relative to the refrigerator oil (polyvinyl ether).

Furthermore, in Example 1 to Example 12, and Comparative Example 1 to Comparative Example 5, the total acid number (mgKOH/g) of the refrigerator oil after heat treatment and the fluorine amount (ppm) in the refrigerator oil were measured, and the metal catalyst surface was visually observed for discoloration, in a manner similar to Reference Example 1. The result is illustrated in Table 2.

Also, the residual percentage of each component of the additives (V), (X), (Y), and (Z) contained in the refrigerator oil after heat treatment is indicated as After test (%) in Table 2.

Evaluation Results of Example 1 to Example 12, and Comparative Example 1 to Comparative Example 5

As illustrated in the additives (V), (X), (Y), and (Z) in Table 2, Example 1 to Example 12 contain the alicyclic epoxy compound, the aliphatic epoxy compound, and the tertiary phosphate each in an amount of 0.1% by mass to 2.0% by mass relative to the refrigerator oil.

On the contrary, in Comparative Example 1 to Comparative Example 4, the amount of one of the alicyclic epoxy compound, the aliphatic epoxy compound, and the tertiary phosphate is less than 0.1% by mass.

Also, in Comparative Example 5, the amount of the alicyclic epoxy compound indicated by (V) exceeds 2.0% by mass.

In Comparative Example 1 to Comparative Example 4, the total acid number is large, and the fluorine amount in oil is also large. Also, in Comparative Example 2 to Comparative Example 4, the metal catalyst was discolored.

Also, in Comparative Example 1 to Comparative Example 4, the amounts of the additives (V), (X), (Y), and (Z) decrease in the refrigerator oil after heat treatment. Particularly, the decomposition and consumption is significant in the alicyclic epoxy compound indicated by (V) of Comparative Example 1, the aliphatic epoxy compound indicated by (X) and the tertiary phosphate indicated by (Z) of Comparative Example 2, the aliphatic epoxy compound indicated by (Y) and the tertiary phosphate indicated by (Z) of Comparative Example 3, and the alicyclic epoxy compound indicated by (V), the aliphatic epoxy compound indicated by (X), and the tertiary phosphate indicated by (Z) of Comparative Example 4.

Also, in Comparative Example 5, the total acid number is large, and the decomposition and consumption of the alicyclic epoxy compound indicated by (V) is significant, in the refrigerator oil after heat treatment. Furthermore, a large amount of a deposit considered to be a polymerized product of the additives was observed in the refrigerator oil after heat treatment.

On the contrary, in Example 1 to Example 12, the total acid number is small, and the fluorine amount in oil is also small. Also, the discoloration of the metal catalyst was not observed.

In addition, the residual percentages of the additives (V), (X), (Y), and (Z) contained in the refrigerator oil after heat treatment are also high. Thus, it was verified that in the present embodiment, the refrigerator oil contains the alicyclic epoxy compound, the aliphatic epoxy compound, and the tertiary phosphate, each in an amount of 0.1% by mass to 2.0% by mass relative to the refrigerator oil, so that the thermochemical stability among the components in these compositions is excellent.

Example 13 and Comparative Example 6

In Example 13, as illustrated in Table 3, there was prepared, as a refrigerator oil, a refrigerator oil containing the polyvinyl ether indicated by (A) similar to Example 1 and the additives (V), (X), and (Z) illustrated in Table 2 at the same ratio as Example 1 (see Before test (% by mass) in Table 2) relative to this refrigerator oil.

TABLE 3

| | | Refrigerator oil | Kinematic viscosity (40° C.) (mm$^2$/s) | Viscosity pressure coefficient (GPa$^{-1}$) | Rolling bearing fatigue average life (h) |
|---|---|---|---|---|---|
| Example | 13 | A | 67.8 | 15.1 | 340 |
| Comparative Example | 6 | D | 68.7 | 10.2 | 126 |

The refrigerator oil containing these additives was measured for high pressure viscosity at 20° C. to 160° C. and 1 to 130 MPa using a falling body-type high pressure viscometer. Then, on the basis of this high pressure viscosity, the viscosity pressure coefficient (GPa$^{-1}$) at 60° C. was calculated in accordance with a calculation method described in the document "Hata, et al, Tribologist, 55 (9), 635 (2010)." The viscosity pressure coefficient (GPa$^{-1}$) is described in Table 3.

Also, in Example 13, the rolling bearing fatigue average life (h) was measured using the refrigerator oil containing the above-described additives.

The measurement for the rolling bearing fatigue average life (h) was performed by a unisteel test method in IP305/79 (The Institute of Petroleum). The measurement condition was such that a single-direction thrust ball bearing 5110 (bearing No. 51110) was used with a rotation axis rotational speed of 1500 rpm, a load of 4800 N, an oil amount of 150 ml, and an oil temperature of 120° C. Then, 11 measurements were performed, and the fatigue life of the rolling bearing was calculated as an average life time by a Weibull distribution. The result is illustrated in Table 3.

Also, in Comparative Example 6, there was used, as the refrigerator oil, the hindered-type polyol ester of (D) in Reference Example 16 in which any of the additives (V), (X), (Y), and (Z) was not contained.

This refrigerator oil was measured for a viscosity pressure coefficient ($GPa^{-1}$) and rolling bearing fatigue average life (h) in a manner similar to Example 13. The result is illustrated in Table 3.

As illustrated in Table 3, it was found that in Example 13, the viscosity pressure coefficient is 15.1 $GPa^{-1}$, and the rolling bearing fatigue average life (h) reaches as long as 340 hours.

On the contrary, in Comparative Example 6, the viscosity pressure coefficient ($GPa^{-1}$) was lower than Example 13 and as low as 10.2 $Pa^{-1}$. Therefore, the result was that the rolling bearing fatigue average life (h) was also as short as 126 hours.

Example 14, and Comparative Example 7 and Comparative Example 8

Using a package air conditioner (14.0 kW model) mounted with the scroll-type electric compressor 3 illustrated in FIG. 3, a 3000-hour endurance test in a high-speed high-load condition was performed.

The rotational speed of the electric compressor 3 was set at 6000 rpm. For the insulation between the iron core and the coil of the electric motor 24, a 250-µm heat resistant PET film (B type130° C.) was used. For the main insulation of the coil, a copper wire double-coated with polyester imide-amide imide was used. As a refrigerant, a mixed refrigerant of HFC32/HFO1234yf/HFC125 (GWP=about 680) was used. The refrigerating cycle was filled and sealed with 4000 g of the mixed refrigerant. As a refrigerator oil, there was used 1000 mL of the polyvinyl ether oil (base oil) having a kinematic viscosity at 40° C. of 67.8 $mm^2$/s used in Example 1.

The additives of this refrigerator oil (base oil) were: 3,4-epoxycyclohexylmethyl-3,4-epoxycyclohexanecarboxylate as the alicyclic epoxy compound indicated by (V) in an amount of 0.5% by mass relative to the refrigerator oil (base oil); 0.5% by mass of 2-ethylhexyl glycidyl ether as the aliphatic epoxy compound indicated by (X); and 1.0% by mass of tricresyl phosphate as the tertiary phosphate indicated by (Z). Also, to this refrigerator oil (base oil), there was added an antioxidant (DBPC; 2,6-di-t-butyl-p-cresol) in an amount of 0.25% by mass relative to the refrigerator oil (base oil).

On the other hand, in Comparative Example 7, a 3000-hour endurance test was performed in the same condition as Example 14, except that the polyol ester of the refrigerator oil (D) in Reference Example 16 (see Table 1) was used in place of the refrigerator oil containing the additives in Example 14.

Also, in Comparative Example 8, a 3000-hour endurance test was performed in the same condition as Example 14, using the refrigerator oil and the combination of additives used in Comparative Example 2 (see Table 2).

After this package air conditioner was operated for 3000 hours, the mounted electric compressor 3 was disassembled, and checked for the wear state and the flaking occurrence state of the rolling bearing (the main bearing 31 and the sub-bearing 32 (see FIG. 3)).

Flaking was not observed on the rolling element and the raceway surfaces of the inner and outer rings of the rolling bearing which constitutes the main bearing 31 and the sub-bearing 32 of the electric compressor 3 according to Example 14. Also, it was found that wear is extraordinarily rare at the tip of the revolving scroll member 21 and the fixed scroll member 19 (see FIG. 3) and the sliding portion of the Oldham ring 38 and the like.

Also, for determining the deterioration of the refrigerator oil, the total acid number was measured by a titration method, and the residual amount of the additive by gas chromatography. The total acid number after the test was as low as 0.04 mgKOH/g. The residual amount of the additive (V) was 74%, the additive (X) 68%, and the additive (Z) 91%, which demonstrated excellent reliability for a long period of time.

On the contrary, in Comparative Example 7, flaking traces were observed on the raceway surface of the inner ring of the main bearing 31 and the sub-bearing 32 (see FIG. 3). Furthermore, wear was significantly observed in other sliding portions.

Also, in Comparative Example 8, wear was small in the sliding portion of the electric compressor 3, but the total acid number after the test had increased to 0.95 mgKOH/g. Also, the residual amount of the additive (X) was 0% indicating disappearance, and the additive (Z) was 33% indicating drastic decrease.

Example 15 and Comparative Example 9

In Example 15, there was prepared the electric compressor 3 (see FIG. 3) including the fixed scroll member 19 and the revolving scroll member 21 (see FIG. 3) as well as a frame 22 (see FIG. 3) each formed with a high strength, wear resistant aluminum-silicon eutectic alloy containing 10 to 12% by mass of silicon.

This electric compressor 3 was subjected to an endurance test similar to Example 14, except that the test time was changed from 3000 hours to 500 hours. It is noted that the fixed scroll member 19 and the revolving scroll member 21 (see FIG. 3) as well as the frame 22 (see FIG. 3) each formed with an aluminum-silicon eutectic alloy are not subjected to surface treatment.

Also, in Comparative Example 9, an endurance test was performed in a manner similar to Example 15, except that the refrigerator oil of Comparative Example 7 was used.

In Example 15, significant wear had not proceeded in the fixed scroll member 19 and the revolving scroll member 21 (see FIG. 3) as well as the frame 22 (see FIG. 3). Also, the total acid number of the refrigerator oil was 0.04 mgKOH/g, indicating no increase.

On the contrary, in Comparative Example 9, a tribochemical reaction proceeded in the sliding portion of the fixed scroll member 19 and the revolving scroll member 21 (see FIG. 3) as well as the frame 22 (see FIG. 3). Therefore, the test was interrupted after the passage of 72 hours due to the wear of the sliding portion. Furthermore, the total acid number of the refrigerator oil was 0.53 mgKOH/g, indicating drastic increase and advanced deterioration.

As understood from the above results of Examples, the Example can provide a refrigeration air-conditioning apparatus having a small environmental load and high efficiency, and an electric compressor having high reliability.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.cooler

What is claimed is:

1. An electric compressor comprising;
in a sealed container, a compression mechanism to compress a refrigerant and an electric motor to drive the compression mechanism,
wherein the refrigerant contains 20% by mass or more of hydrofluoroolefin, and
wherein a refrigerator oil stored in the sealed container contains:
polyvinyl ether as a base oil,
an alicyclic epoxy compound in an amount of 0.1% by mass or more and 2.0% by mass or less relative to the base oil,
an aliphatic epoxy compound in an amount of 0.1% by mass or more and 2.0% by mass or less relative to the base oil, and
tertiary phosphate in an amount of 0.1% by mass or more and 2.0% by mass or less relative to the base oil.

2. The electric compressor according to claim 1, wherein the electric motor drives the compression mechanism through a crankshaft supported by a rolling bearing to be lubricated with the refrigerator oil.

3. A refrigeration air-conditioning apparatus comprising the electric compressor according to claim 2.

4. The electric compressor according to claim 1, wherein the hydrofluoroolefin is at least one selected from 2,3,3,3-tetrafluoropropene, 1,3,3,3-tetrafluoropropene, trifluoroethene, and 3,3,3-trifluoropropene.

5. A refrigeration air-conditioning apparatus comprising the electric compressor according to claim 4.

6. The electric compressor according to claim 1, wherein the alicyclic epoxy compound is 3,4-epoxycyclohexylmethyl-3,4-epoxycyclohexanecarboxylate.

7. A refrigeration air-conditioning apparatus comprising the electric compressor according to claim 6.

8. The electric compressor according to claim 1, wherein the aliphatic epoxy compound is at least one selected from an alkyl glycidyl ester compound and an alkyl glycidyl ether compound.

9. A refrigeration air-conditioning apparatus comprising the electric compressor according to claim 8.

10. The electric compressor according to claim 1, wherein the tertiary phosphate is tricresyl phosphate.

11. A refrigeration air-conditioning apparatus comprising the electric compressor according to claim 10.

12. The electric compressor according to claim 1, wherein the compression mechanism includes a revolving scroll member and a fixed scroll member which mesh with each other to form a compression chamber, and
the revolving scroll member and the fixed scroll member are formed with aluminum alloy.

13. A refrigeration air-conditioning apparatus comprising the electric compressor according to claim 12.

14. A refrigeration air-conditioning apparatus comprising the electric compressor according to claim 1.

15. The electric compressor according to claim 1, wherein the polyvinyl ether is represented by formula

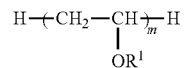

wherein $R^1$ is an alkyl group of 1 to 4 carbon atoms and m is an integer of 5 to 15,
wherein the alicyclic epoxy compound is 3,4-epoxycyclohexylmethyl-3,4-epoxycyclohexanecarboxylate,
wherein the aliphatic epoxy compound is either
2-ethylhexyl glycidyl ether or
alkyl glycidyl ester including an alkyl group of 4 to 9 carbon atoms, and
wherein the tertiary phosphate is tricresyl phosphate.

* * * * *